Oct. 28, 1930.  H. NEWMAN  1,779,635
OPTICAL PROJECTING INSTRUMENT
Filed Aug. 9, 1927  4 Sheets-Sheet 2
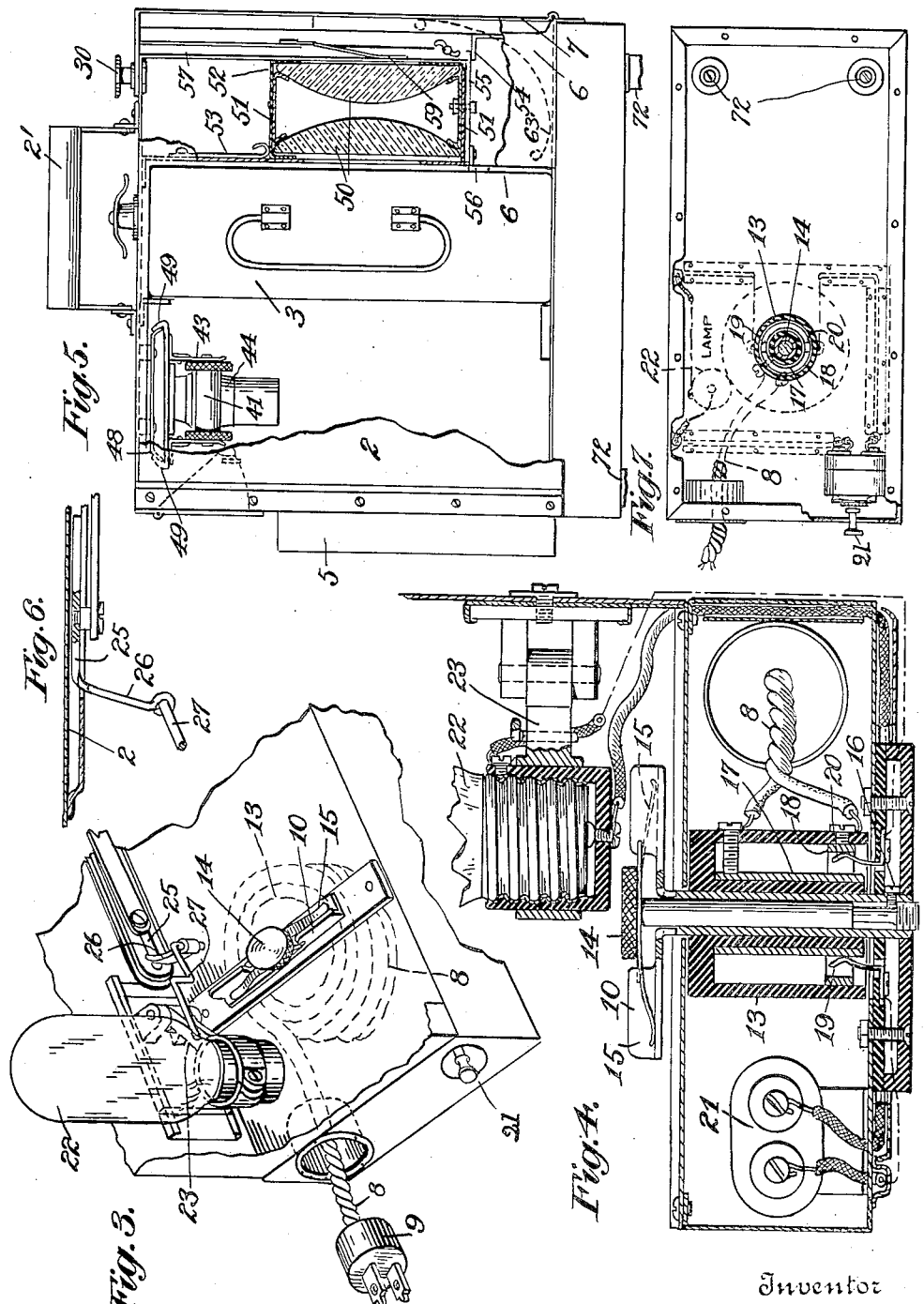
Inventor
Hugo Newman.
By his Attorney Oct. 28, 1930.                    H. NEWMAN                    1,779,635
                        OPTICAL PROJECTING INSTRUMENT
                           Filed Aug. 9, 1927        4 Sheets-Sheet 3
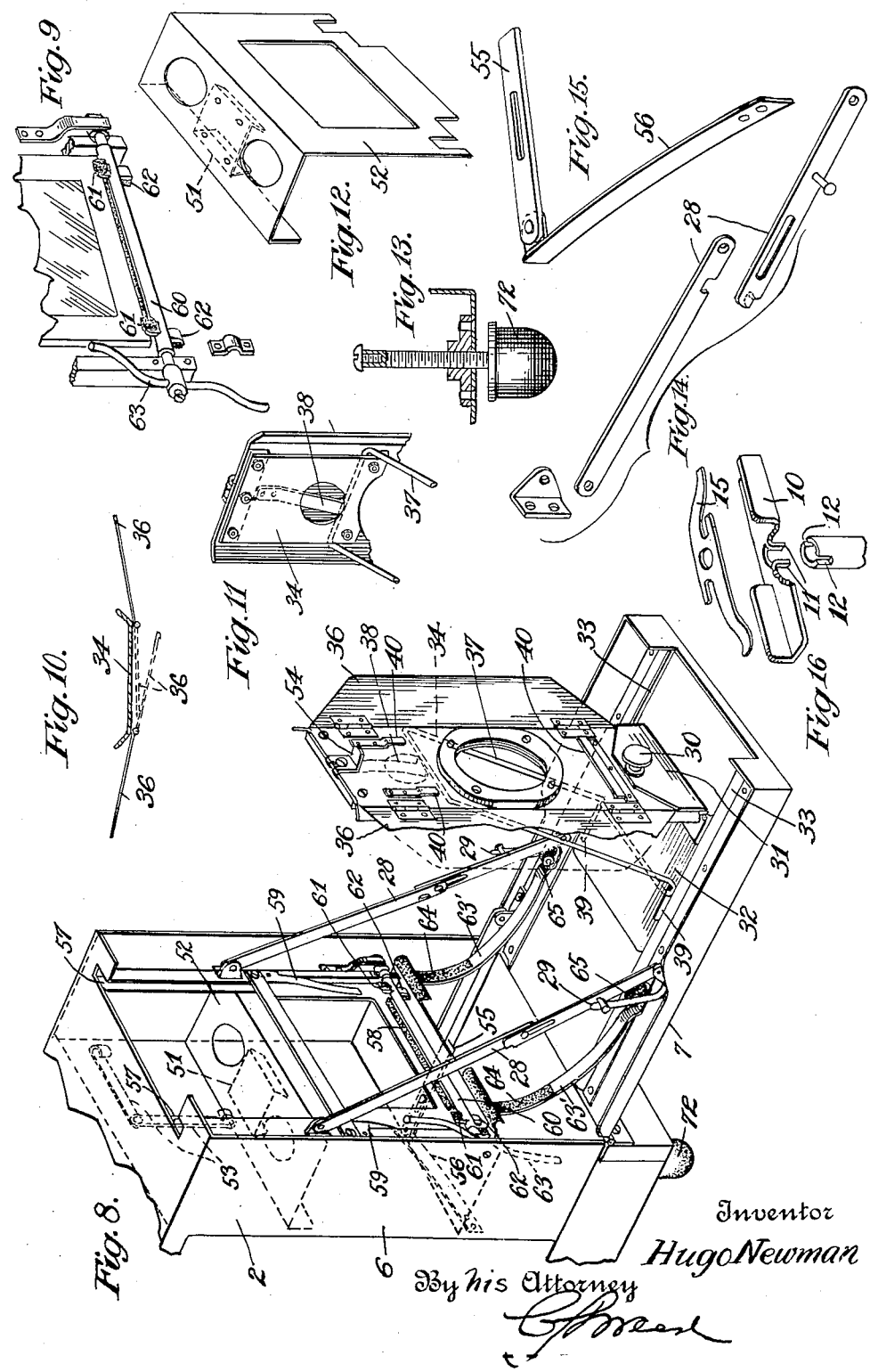
Inventor
Hugo Newman
By his Attorney Oct. 28, 1930. H. NEWMAN 1,779,635
OPTICAL PROJECTING INSTRUMENT
Filed Aug. 9, 1927 4 Sheets-Sheet 4
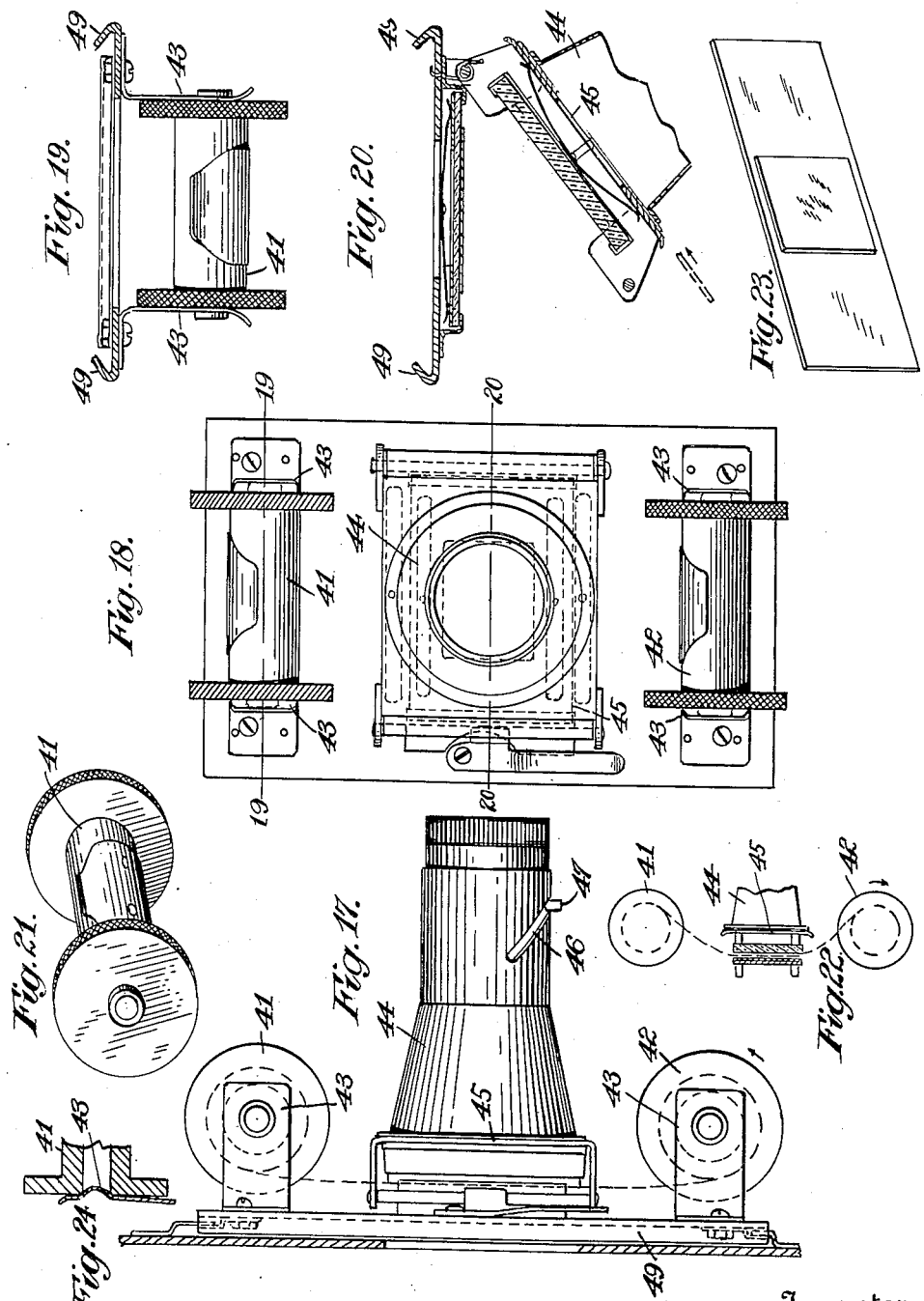
Inventor
Hugo Newman
By his Attorney Patented Oct. 28, 1930

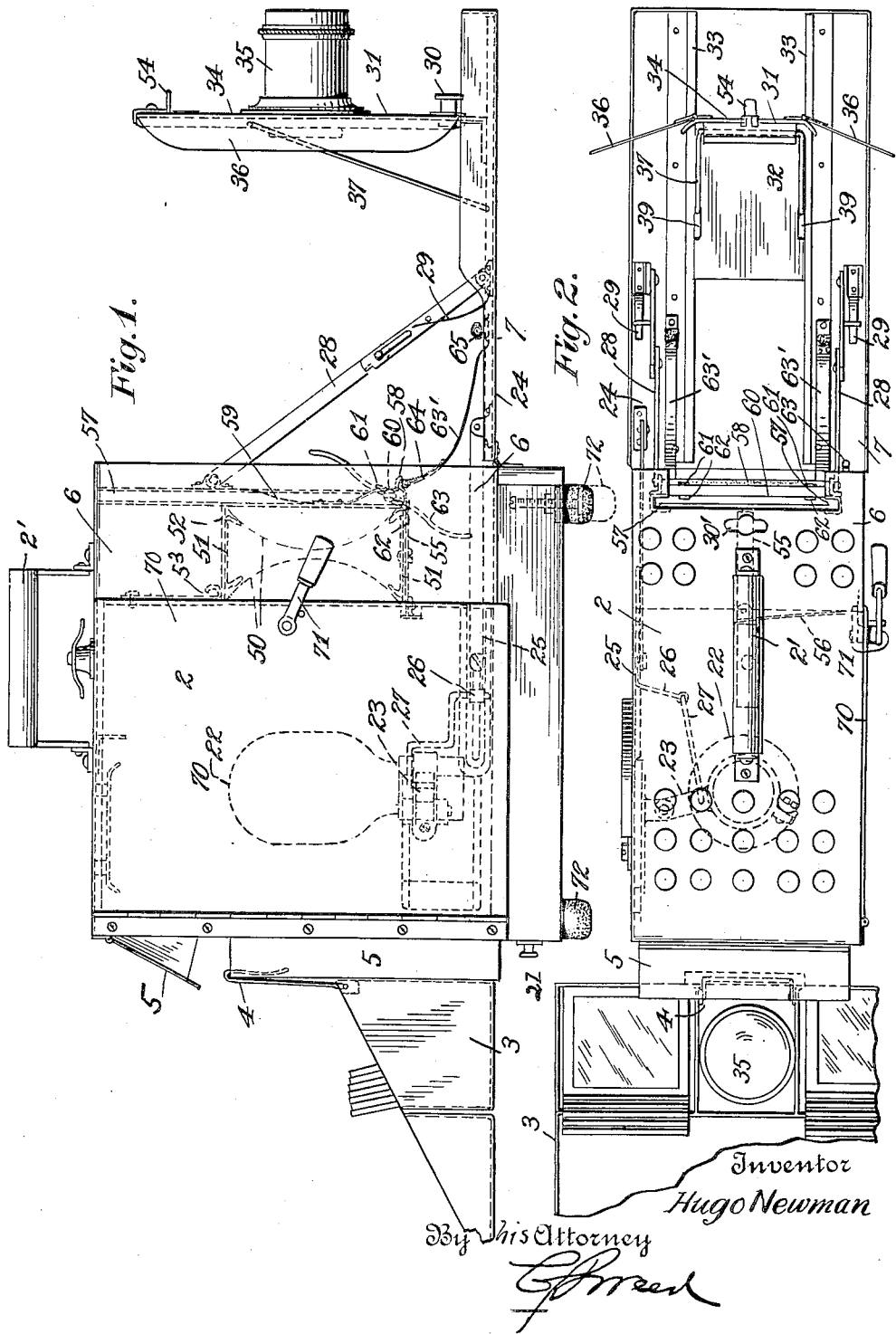

1,779,635

UNITED STATES PATENT OFFICE

HUGO NEWMAN, OF NEW YORK, N. Y.

OPTICAL PROJECTING INSTRUMENT

Application filed August 9, 1927. Serial No. 211,664.

This invention relates to optical projecting instruments, an object of the invention being to provide an improved instrument for the projection of various kinds of still pictures, such as glass lantern slides, film slides (strip film) microscopic slides, etc., which is compact, comparatively simple, portable, relatively inexpensive and easily operated, and all of the parts of which are compactly housed in a single container or box as a complete unitary structure.

A further object of the invention is the provision of an improved instrument of the class described comparatively small and compact, but which will contain within itself all the attachments needed to adapt it to its various purposes and which is especially designed to meet the needs of schools, business and the home.

A further object of the invention is the provision of an improved machine of the class described in which there is provided improved means for guiding and manipulating the slides, improved means for carrying or mounting the condensing lenses; improved means for supporting the slide carrying box on the exterior of the instrument casing whereby it may be utilized as a reading desk during the manipulation of the instrument; improved means for reeling the electric cord or conduit; improved means for supporting the projecting lens; improved means for positioning the lamp during the opening and closing of the casing or box; improved means for tilting the box or casing; improved means for supporting the film carrier both within the casing when not in use and in position for use together with other improved means which will appear in the specification.

In the drawings accompanying and forming part of this specification, Fig. 1 is a side view of this improved projecting instrument in its opened position, parts thereof being shown in dotted lines; Fig. 2 is a top view of the instrument in its open position; Fig. 3 is a partial view of the lamp compartment illustrating the electric cable partly in dotted lines and the means for winding the same; Fig. 4 is a vertical sectional view through the lamp compartment illustrating the electric contacts and method of connecting the lamp wires so that they may be reeled up; Fig. 5 is a side view of the casing partly broken away and partly in section illustrating the manner in which the film carrier and the condensing lens are supported and also the manner of supporting the slide box carrier; Fig. 6 is a detail view partly in section of the connection with the lamp whereby the lamp may be properly positioned; Fig. 7 is a bottom partly sectional view of that part of the instrument shown in Fig. 4; Fig. 8 is a perspective view of the front part of the instrument in its open position; Fig. 9 is a detail perspective view of the slide releasing means; Fig. 10 is a detail partly sectional view of the lens frame and light shields; Fig. 11 is a detail perspective view of the lens frame; Fig. 12 is a perspective view of the condensing lens supporting means; Fig. 13 is a partly sectional view of one of the adjustable feet for the front of the instrument whereby it may be tilted; Fig. 14 is a detail view of the means connecting the foldable lens supporting means with the casing; Fig. 15 is a detail view of a part of the front cover locking means; Fig. 16 is a detail view of a part of the cord reeling means; Fig. 17 is a partly sectional view of the film support or carrier; Fig. 18 is a front view thereof; Fig. 19 is a partly sectional view illustrating one means for supporting the film spool; Fig. 20 is a detail partly sectional view illustrating the manner in which the film carrier may be opened; Fig. 21 is a perspective view of one of the film spools; Fig. 22 is a view partly in section of the film carrier; Fig. 23 is a view of a microscopic slide which may be used in place of the film; Fig. 24 illustrates a modification of the means for supporting a film spool in position.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

This improved projecting instrument consists in its preferred form of a rectangular metal case or box 2 in which are housed the optical parts as the lenses, lamp, reflectors, film carrier, slide box, the necessary number of feet of connecting cord, etc., and which casing is enclosed by a suitable cover (not shown) but through the top of which cover the handle 2' will project. A slide box 3 holding about 50 glass-slides is supported in the case when not in use. This box also carries the lenses, and other instrumentalities or it may be used to store films, microscopic slides and other accessories. When removed from the casing it may be attached to the back of the instrument for which purpose the box is provided with a hooked hanger 4 adapted to hook into a projecting rear part of the casing. In this position, the box may serve as a reading desk being lighted by reflection thru the ventilator 5 at the rear of the instrument. The box comprises a body portion 6 having a hinged cover 7. The lamp connecting cord 8 is so supported that it may be drawn out, see Fig. 3, from the rear of the base of the casing and is provided with a suitable plug 9 for attachment to an electrical outlet. The cord is reeled within the base of the casing and therefore only the desired length need be pulled out. A suitable winding key 10 is provided for reeling the cord when not in use. This key 10, see Fig. 16, is provided with a pair of projections 11 adapted to engage notches 12 of the reel stem on which the insulated reel 13 is mounted. Through this stem a tripod connecting means or bolt 14 extends being held up by a spring 15. On pressing this bolt 14 down it may be turned so that the threaded lower end will project into the tripod. Detachment of this bolt 14 is prevented by a screw 16 extending into an annular recess of the bolt. The reel has circular contact members, one in the form of a cylinder 17 and the other in the form of a circular band 18 with which the contacts 19 and 20 are respectively in engagement at all times and to these contact members the lamp and connecting cord are suitably connected, as is also the switch.

The lamp is controlled by a suitable switch 21 located at the rear of the casing. The lamp 22 is shown supported within the casing by a suitable swinging bracket 23 secured to one wall of the casing and this bracket is connected with the front 24 of the casing being hinged at its bottom so that it may be let down. The positioning of this front swings the lamp bracket 23 and therefore the lamp into into its correct position for the operation of the instrument. On swinging the front of the casing up the box is entirely closed. The swinging front is connected to the lamp bracket 23 by a sliding bar 25 having a bent arm 26 pivoted thereto and to which a rod 27 is pivoted the opposite end of which is pivoted to the bracket 23, see Figs. 3 and 6, so that on swinging the front up or down the lamp will be swung into or out of position in the casing.

The connecting levers 28, see Fig. 14, between the casing and swinging front are pivoted to these parts and are slotted to permit the proper swinging movement of the front, suitable springs 29 being provided to maintain these levers in their extended positions.

Slidingly supported by the swinging cover or front on the interior thereof is a lens carrying frame 31 comprising a horizontal bed or plate 32 shiftable along a guideway 33 of the cover by means of a knob 30. This plate has at its outer end a swinging lens board 34 provided with a proper threaded opening for the reception of a lens 35 which is focused by sliding the board and by turning the lens in its barrel. This board may be swung into vertical position to receive the lens or swung down into position to permit the front cover to be closed. Carried by this lens board is a pair of light shields 36 hinged thereto foldable one upon the other. To maintain the lens supporting frame in its vertical position a suitable wire support 37 is provided with a shiftable hinge connection at its upper end to the lens board and automatically clamped in position by a shiftable spring 38, the release of which permits the lens board to be folded. The lower end of this wire support is suitably carried by the sliding bed or plate 32 and for that purpose extends through slots 39 in the side of the bed. The lens board 34 is provided with suitable clamping members or clips 40 below and above the lens opening for the purpose of supporting a film carrier, upon the removal of the lens 35, which comprises a pair of film spools 41 and 42, each supported between a pair of swinging spring clamps 43, see Figs. 19 and 24 for instance, which show different spring formed means for supporting these spools. This film carrier is provided with a hinged lens 44, see Fig. 20, which may be swung open to facilitate the loading of the film spools, and is also so constructed that in place of the films a microscopic slide may be inserted under the spring shield 45 which facilitates the easy movement of the slide, see Figs. 20 and 23. The lens of this film carrier is focused by rotating the lens by means of a diagonal slot 46 and a pin 47, see Fig. 17. This film carrier, when not in use is carried within the casing, the top of which is provided with a suitable guide 48 while the back of the film carrier is provided with guideways 49 for the reception of the guide of the casing. The condensing lenses 50 are suitably supported within the casing being spaced apart by suitable spacers 51, see Figs. 1 and 12, the top one being carried by a removable frame 52, the removal of which permits the removal of the lenses. This frame is held in position by a suitable catch 53.

For the purpose of locking the swinging front cover in its closed position the lens board is provided with a projection 54 and at the under side of the condensing lens compartment a sliding slotted bolt 55 is located being pivotally secured at its rear end to a leaf spring 56, the opposite end of which is fixed, see Figs. 8 and 15. Upon the insertion of the slide carrier box, this spring 56 will shift the bolt 55 forward so as to overlap the projection 54 and as the knob 30 carried by the lens board projects into an opening 30' see Fig. 2 in the top of the casing when the cover is closed it follows that the shifting of this knob thereby to release the cover is prevented by the bolt 55 overlapping the projection 54. In other words, as the knob 30 slides the lens board back and forth when the cover is open, it also effects a slight sliding movement thereof when the cover is closed to permit the knob to be released from the opening in the top of the casing but this is prevented when the glass-slide box is in place since at this time as stated the bolt 55 holds by means of the projection 54 the lens board from having any shiftable movement whatever. When however the glass-slide box is removed the spring 56 withdraws the bolt 55 from over the projection 54 of the lens board and thereupon the knob 30 attached to the lens board can be shifted out of the hole in the top of the casing thereby releasing the front cover and permitting it to be swung down.

When glass slides are used they are positioned by a pair of opposed guide slots 57 forming a guideway for the slides and located at the front of the casing, these slots opening at the top of the casing so that the slides may be dropped into position in front of the condensers, a suitable cushion 58 being provided to prevent the breakage of the slides. The slides are held in proper centered position for use by a pair of spring clips 59 and at the under sides of the slide guideway is located a rock shaft 60 carrying at each end a pair of opposed projections 61 and 62. This rock shaft is operated by means of a projecting handle 63 so that after the slide has been exposed, it is automatically ejected by manipulating the handle whereupon one pair of projections as 61 or 62 engage the rear of the slide at the bottom and shove it forward into position to slide down a pair of inclined supports 63' provided at the tops thereof with cushioning means 64 and at the bottom thereof with buffers 65 to hold the slides in position for removal, thereby permitting the next slide to drop into position.

The casing is provided with a side door 70 provided with suitable means 71 for locking it in closed position and by means of which the various instrumentalities may be inserted into and removed from the casing.

The casing may be provided with suitable supports or feet 72, the front pair of which are adjustable to tilt the instrument when desired. The casing is also provided with suitable reflectors for reflecting the light in the proper direction. The mechanism of the side door by means of which opaque objects such as post-cards, photographs, printed matter, etc., may be projected will constitute the subject matter of a separate application, and therefore a showing and description of this part of the invention are not deemed necessary herein.

When the operator is through using the instrument he merely disconnects the cord from the light socket, winds it on its reel by means of the key in the base of the casing, removes the lens from the lens board or the film carrier therefrom, folds up the front of the casing which shifts the lamp to the rear and permits the replacement of the glass-slide box and the film carrier in the casing the lens usually being carried in the glass-slide box. The placing of the glass-slide box in the casing locks the front cover in position in the manner hereinbefore described whereupon the cover may be placed over the casing and the instrument readily carried by the handle.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, without attempting to set forth all of the forms in which it may be made, or all of the modes of its use, I claim:

1. A projecting machine comprising a casing, a lamp supported for shiftable movement within the casing from an inoperative to an operative position and vice versa, a swinging lens carrying front cover, means connecting the front cover with the lamp whereby on shifting the cover the lamp will be shifted into or out of operative position.

2. A projecting machine comprising a casing having a shiftable lens carrying part, a lamp supported for shiftable movement within the casing from an inoperative to an operative position and vice versa, and means connecting said shiftable part and lamp whereby on the movement of the former the lamp is shifted into and out of operative position.

3. A projecting machine comprising a casing, a lamp therein supported for swinging movement into and out of position, a shiftable lens carrying front cover, means connecting the front cover with the lamp for shifting the latter into different positions within the casing on the shifting of the front cover, and a glass-slide box insertible into the casing on the shifting of the lamp out of position.

4. A projecting machine comprising a casing, a lamp therein, a glass-slide box insertible into the casing, said casing having a front cover, and means operated by the glass-slide box for locking the cover in closed position.

5. A projecting machine comprising a casing, a lamp supported for shiftable movement into different positions within the casing, means comprising a lens carrying member for shifting the lamp, a glass-slide box insertible into the casing on the movement of the lamp into one position and means carried by the box for suspending it at the rear of the casing when the instrument is in use.

6. A projecting machine comprising a casing having a swinging front cover, a shiftable lens board carried by the front cover, and means carried thereby for detachably supporting a lens or a film carrier on the removal of the lens.

7. A projecting machine comprising a casing having a swinging front cover, a shiftable lens board carried by the front cover, means carried thereby for supporting a film carrier, and means also carried by the casing for supporting the film carrier when not in use.

8. A projecting machine comprising a casing having a lens carrying downwardly-swinging front cover, said casing having guides at its front end in the rear of said front cover for the reception of glass slides, and means for ejecting said slides onto the front cover when swung downwardly.

9. A projecting machine comprising a casing having a lens carrying downwardly-swinging front cover, said casing having guides at its front end in the rear of said front cover for the reception of glass slides, means for ejecting said slides onto the front cover when swung downwardly and comprising a rock shaft having two sets of spaced projections, and means for rotating said shaft thereby to engage the bottom of said slides and eject the same from the guide.

10. A projecting machine comprising a casing having a lamp and lenses, a reel in said casing for the reception of an electrical conduit and having electrical contacts for permanently connecting the lamp with the electrical conduit and means for winding said reel.

11. A projecting machine comprising a casing having a lamp and lenses, a reel in said casing for the reception of an electrical conduit, means for winding said reel, said reel constructed with electric contacts whereby the lamp will be in permanent connection with the electric conduit, and a switch for controlling said lamp, also in permanent connection with the reel.

12. A projecting machine comprising a casing, a lamp supported for shiftable movement within the casing from an inoperative to an operative position and vice versa, a swinging front cover, means connecting the cover with the lamp for shifting it on the movement of the cover into and out of operative position, a shiftable lens board carried by the cover, and means for tilting the front of said casing.

13. A projecting machine comprising a casing having a side door and a swinging front cover, a lamp shiftably supported therein, removable condensing lenses carried by the casing, means connecting the swinging cover with the lamp whereby the movement of the cover will shift the lamp, a slidable lens board carried by the cover, shiftable light shields carried by the lens board, means carried by the lens board for the reception of a lens, and means also carried by the lens board for the reception of a film carrier.

14. A projecting machine comprising a casing, a lamp therein, said casing having a swinging front cover, a shiftable lens board carried thereby, and means carried by the board for the reception of a film carrier, said film carrier comprising a pair of spools and a swinging lens openable to permit the loading of the spools.

15. A projecting machine comprising a casing, a lamp therein, said casing having a swinging front cover, a shiftable lens board carried thereby, means carried by the board for the reception of a film carrier, said film carrier comprising a pair of spools, a swinging lens openable to permit the loading of the spools, and means carried by the film carrier for the reception of a microscopic slide.

16. A projecting machine comprising a casing, a lamp therein, condensing lenses carried thereby, a swinging front cover, a swinging and sliding lens board carried by said cover, and means for automatically locking said lens board in its upright position and having a shiftable hinge connection with the lens board.

17. A projecting machine comprising a casing, a lamp therein, condensing lenses carried thereby, a swinging front cover, a swinging and sliding lens board carried by said cover, means for automatically locking said lens board in its upright position, means carried by said lens board for supporting a lens and means also carried by said lens board for supporting a film carrier.

18. A projecting machine comprising a casing, a lamp therein, condensing lenses carried thereby, a swinging front cover, a swinging and sliding lens board carried by said cover, means for automatically locking said lens board in its upright position, means carried by said lens board for supporting a lens, means also carried by said lens board for supporting a film carrier, a glass slide box carried by the casing, and means automatically operated thereby for locking the swinging cover in closed position.

19. A projecting machine comprising a casing, a lamp shiftably supported therein, a swinging front cover, means connecting the lamp with the cover whereby the lamp is shiftable on the movement of the cover, a sliding lens board carried by the cover, means carried thereby for supporting a lens, means also carried thereby for supporting a film carrier, said film carrier having means for supporting microscopic slides, means for guiding the glass-slides in position to be projected, means for ejecting said slides, a glass-slide box carried by the casing, means operated thereby for locking the front cover in closed position, and means for supporting said slide box in position as a reading desk.

20. A projecting machine comprising a casing, a lamp shiftably supported therein, a swinging front cover, means connecting the lamp with the cover whereby the lamp is shiftable on the movement of the cover, a sliding lens board carried by the cover, means carried thereby for supporting a lens, means also carried thereby for supporting a film carrier, said film carrier having means for supporting miscroscopic slides, means for guiding the glass slides in position to be projected, means for ejecting said slides, a glass-slide box carried by the casing, means operated thereby for locking the front cover in closed position, means for supporting said slide box in position as a reading desk, reeling means carried by the casing for the reception of an electric conduit, and a switch carried by the casing, said conduit having permanent connection with the lamp, the switch and the reeling means.

21. A projecting machine comprising a casing, a lamp supported in an upright position for shiftable movement within the casing from an inoperative to an operative position and vice versa, a lens-carrying member shiftably supported by the casing, and means connecting said shiftable member with the lamp whereby the latter is shifted on the movement of the former into and out of operative position.

22. A projecting machine comprising a casing, a lamp supported in an upright position for shiftable movement within the casing from an inoperative to an operative position and vice versa, a member shiftably supported by the casing, means connecting said shiftable member with the lamp whereby the latter is shifted on the movement of the former into and out of operative position, and a shiftable lens board carried by said shiftable member.

23. A projecting machine comprising a casing, a lamp supported in an upright position for shiftable movement into different positions within the casing, a member shiftably supported by the casing, means connecting said shiftable member with the lamp whereby the latter is shifted on the movement of the former, and a sliding and swinging lens board carried by said shiftable member.

24. A projecting machine comprising a casing, a lamp supported in an upright position for shiftable movement into different positions within the casing, a member shiftably supported by the casing, means connecting said shiftable member with the lamp whereby the latter is shifted on the movement of the former, a shiftable lens board carried by said shiftable member, means carried by the casing for guiding glass slides, and means carried by the casing for ejecting said slides onto said shiftable member when in one of its shifted positions.

25. A projecting machine comprising a casing, a lamp shiftably supported within the casing at the rear thereof, a downwardly-swinging lens carrying front cover, and means connecting the front cover with the lamp whereby on swinging the cover the lamp will be shifted within the casing into and out of operative position.

26. A projecting machine comprising a casing, a lamp shiftably supported within the casing in a permanently upright position, a shiftable lens carrying front cover, and means connecting the front cover with the lamp whereby on shifting the front cover the lamp will be shifted within the casing into and out of operative position.

27. A projecting machine comprising a casing having a downwardly-swinging front cover, said casing having guides at its front end in the rear of said front cover for the reception of glass slides, means for ejecting said slides onto the front cover when swung downwardly, and inclined supports having their upper ends terminating adjacent to said ejecting means and the lower ends terminating on the front cover.

28. A projecting machine comprising a casing having a downwardly-swinging front cover, said casing having guides at its front end in the rear of said front cover for the reception of glass slides, means for ejecting said slides onto the front cover when swung downwardly, and inclined supports having their upper ends terminating adjacent to said ejecting means and the lower ends terminating on the front cover and provided with slide cushioning means at the upper and lower ends thereof.

29. A projecting machine comprising a casing, a lamp supported therein in a permanent upright position for swinging movement into different positions within the casing, condensing lenses carried by the casing, a downwardly-swinging front cover, means connecting the front cover with the swinging lamp for swinging the lamp into different positions within the casing on the swinging of the cover, a swinging and sliding lens board carried by said cover, a slide box adapted to fit within the casing when the lamp is swung into one position and adapted to be supported by the rear of the casing when the lamp is in another position, means carried by the casing for guiding the slides, and means carried by the casing for ejecting the slides onto the cover when in its downwardly-swung position.

30. A projecting machine comprising a casing, a lamp supported therein in a permanent upright position for swinging movement into different positions within the casing, condensing lenses carried by the casing, a downwardly-swinging front cover, means connecting the front cover with the swinging lamp for swinging the lamp into different positions within the casing on the swinging of the cover, a swinging and sliding lens board carried by said cover, a slide box adapted to fit within the casing when the lamp is swung into one position and adapted to be supported by the rear of the casing when the lamp is in another position, means carried by the casing for guiding the slides, means carried by the casing for ejecting the slides onto the cover when in its downwardly-swung position, and means automatically operated by the slide box for locking the swinging cover in closed position.

31. A projecting machine comprising a casing, a lamp supported therein in a permanent upright position for swinging movement into different positions within the casing, condensing lenses carried by the casing, a downwardly-swinging front cover, means connecting the front cover with the swinging lamp for swinging the lamp into different positions within the casing on the swinging of the cover, a swinging and sliding lens board carried by said cover, a slide box adapted to fit within the casing when the lamp is swung into one position and adapted to be supported by the rear of the casing when the lamp is in another position, means carried by the casing for guiding the slides, means carried by the casing for ejecting the slides onto the cover when in its downwardly-swung position, means automatically operated by the slide box for locking the swinging cover in closed position, and means for automatically locking the sliding and swinging lens board in its upright position.

Signed at New York, N. Y., this 4th day of August, 1927.

HUGO NEWMAN.